(12) United States Patent
Ootoshi et al.

(10) Patent No.: US 8,754,148 B2
(45) Date of Patent: Jun. 17, 2014

(54) PIGMENT COMPOSITION FOR PRINTING INK, METHOD FOR PRODUCING THE SAME AND METHOD FOR PRODUCING PRINTING INK

(75) Inventors: Yoshiharu Ootoshi, Sakura (JP); Masayoshi Takahashi, Kamisu (JP); Yuuichi Ayuta, Kamisu (JP)

(73) Assignee: DIC Corporation, Tokyo (JP)

( * ) Notice: Subject to any disclaimer, the term of this patent is extended or adjusted under 35 U.S.C. 154(b) by 441 days.

(21) Appl. No.: 12/809,296

(22) PCT Filed: Dec. 19, 2008

(86) PCT No.: PCT/JP2008/073157
§ 371 (c)(1),
(2), (4) Date: Sep. 2, 2010

(87) PCT Pub. No.: WO2009/081850
PCT Pub. Date: Jul. 2, 2009

(65) Prior Publication Data
US 2010/0331460 A1    Dec. 30, 2010

(30) Foreign Application Priority Data
Dec. 21, 2007    (JP) ................... 2007-329938

(51) Int. Cl.
*C09D 11/02* (2014.01)
(52) U.S. Cl.
USPC .............. 523/160; 523/161; 524/88; 106/412
(58) Field of Classification Search
USPC ....................................................... 523/160
See application file for complete search history.

(56) References Cited

U.S. PATENT DOCUMENTS 6,860,934 B2 *    3/2005    Shiromaru et al. ........... 106/412

FOREIGN PATENT DOCUMENTS

| EP | 1548070 A1 | 6/2005 |
|---|---|---|
| EP | 2412673 A1 | 2/2012 |
| JP | 2-294365 A | 12/1990 |
| JP | 3139396 B2 | 2/2001 |
| JP | 3159049 B2 | 4/2001 |
| JP | 2003-41173 A | 2/2003 |
| JP | 2003-49102 A | 2/2003 |
| JP | 2003-73581 A | 3/2003 |
| JP | 2003-165925 * | 6/2003 |
| JP | 2003-165925 A | 6/2003 |
| JP | 2003-231829 A | 8/2003 |
| JP | 2004-287100 A | 10/2004 |
| JP | 2004-287151 A | 10/2004 |
| JP | 2005-75919 A | 3/2005 |
| JP | 2006-206804 A | 8/2006 |
| JP | 3872356 B2 | 1/2007 |

OTHER PUBLICATIONS

Machine translation of JP 2003-041173.*
Machine translation of JP 2003-165925.*
A. Shoten "Ganryo no Jiten," Sep. 25, 2000, p. 172, table II.3.8, p. 173, right column, line 16 to p. 174; left column, line 6.
International Search Report of PCT/JP2008/073157, date of mailing Feb. 17, 2009.
European Search Report dated May 7, 2013, issued in corresponding European Patent Application No. 08864734.2 (7 pages).

* cited by examiner

*Primary Examiner* — Doris Lee
(74) *Attorney, Agent, or Firm* — Westerman, Hattori, Daniels & Adrian, LLP

(57) ABSTRACT

The present invention provides a method for producing a pigment composition for a printing ink, which involves the step of dry-milling crude copper phthalocyanine using calcium carbonate having a specific property; a pigment composition for a printing ink; and a method for producing a printing ink using the pigment composition. Specifically, the present invention provides a method for producing a pigment composition for a printing ink, which involves the step of dry-milling crude copper phthalocyanine and calcium carbonate having a primary particle diameter of 20 to 1500 nm in the absence of a resin for a printing ink; a pigment composition produced by the method; and a method for producing a printing ink, which includes the steps of heating a mixture of a pigment composition, a resin for a printing ink and a solvent for the printing ink, and wet-milling the heated mixture.

3 Claims, 1 Drawing Sheet

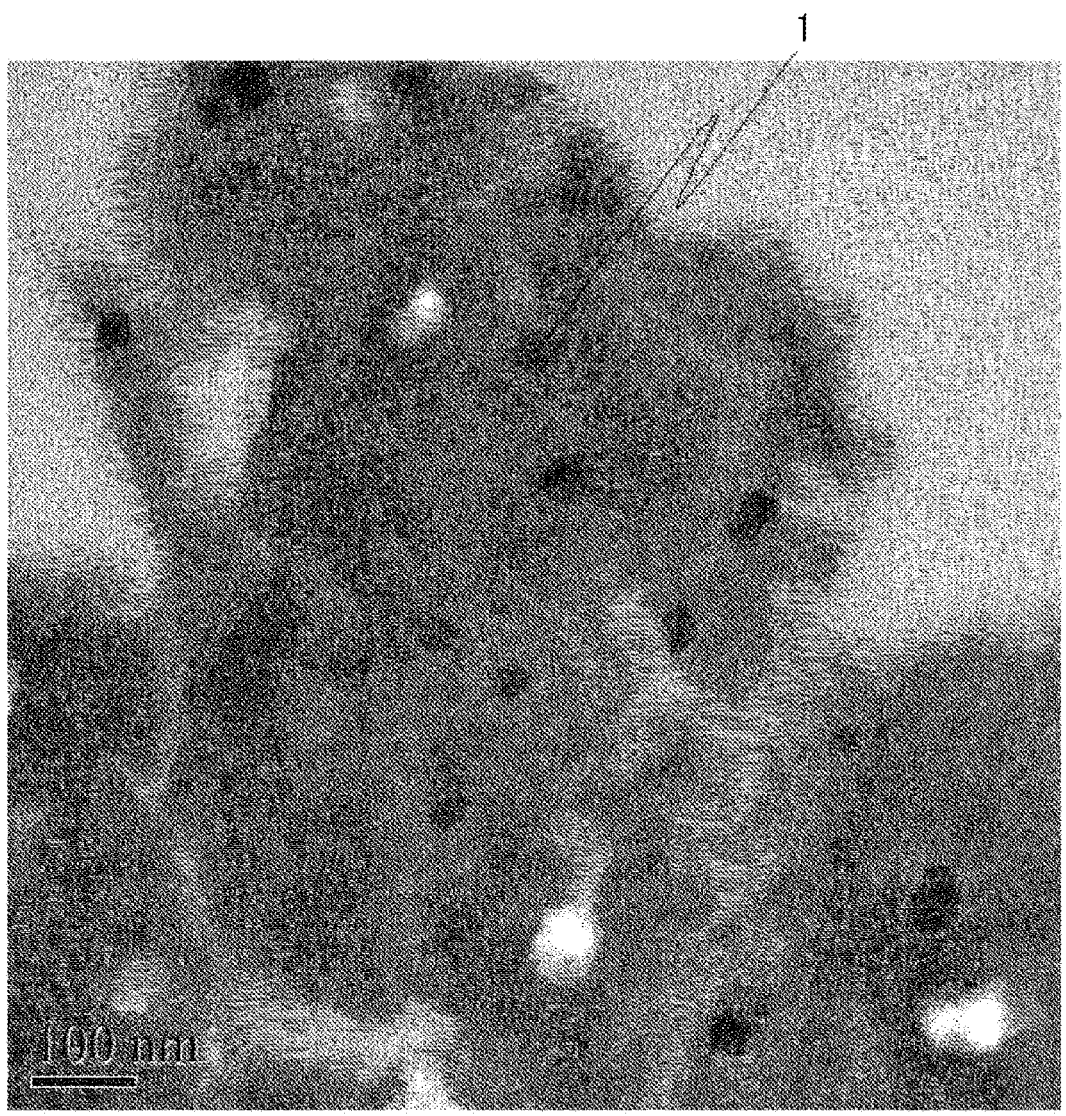

PIGMENT COMPOSITION FOR PRINTING INK, METHOD FOR PRODUCING THE SAME AND METHOD FOR PRODUCING PRINTING INK

TECHNICAL FIELD

The present invention relates to a method for producing a pigment composition for a printing ink containing a certain specific extender pigment, a pigment composition for a printing ink obtained by the method for producing the same, and a method for producing a printing ink using the same.

BACKGROUND ART

Heretofore, a printing ink has been produced by uniformly dispersing a printing ink composition composed of a pigment, which is obtained by subjecting giant needle stable type (β type) crystal particles having an average particle diameter of several to several hundred microns of a synthetic copper phthalocyanine to a microtization and pigmentation treatment thereby controlling the average particle diameter of the particles within a range from about 20 to 300 nm, in a varnish for a printing ink and a solvent for a printing ink using a kneading disperser such as a kneader, a roll mill or a beads mill. In this pigmentation treatment, a solvent salt milling method of adding a milling aid (common salt, etc.) and an organic solvent capable of promoting crystal transition into a stable (β type) crystal to a crude copper phthalocyanine and milling the mixture is widely used. However, this method requires an operation of separation and refinement of the pigmented copper phthalocyanine, the milling aid, and the organic solvent, and a large amount of waste water is generated, and thus an enormous amount of time and labors are required. As a method for solving this problem, there is proposed a method in which a dry-milled crude copper phthalocyanine is used as a pigment precursor which is a raw material for a printing ink (hereinafter referred to as a prepigment).

For example, Patent Document 1 describes a method for producing copper phthalocyanine suited for a pasty printing ink, which includes adding a resin to be contained in a completed printing ink in the proportion of 0.5 to 10% based on the amount of the pigment when a crude copper phthalocyanine is milled by a ball mill, and also describes the use of an alkyd resin, a hydrocarbon resin, a rosin resin modified with maleimide, or a rosin resin modified with phenol, as a resin.

Furthermore, Patent Document 2 describes a method for producing a printing ink containing copper phthalocyanine particles of a stable (β type) crystal having an aspect ratio of 1 to 2, which includes adding a resin for a printing ink to a crude copper phthalocyanine in the proportion of 20 to 80% by mass based on the copper phthalocyanine, dry-milling the mixture at 80 to 170° C., and heating the resulting milled product in a solvent or varnish for a printing ink.

These processes are methods which are advantageous in that the inhibitory effect of aggregation of copper phthalocyanine particles dry-milled by the resin added, and that the added resin containing the same components as those of the resin for a printing ink is used.

Furthermore, Patent Document 3 describes a method for producing a printing ink, which includes adding a mixture, which are obtained by adding a resin in the amount of 1 to 200% by mass based on a crude copper phthalocyanine and a solvent in the amount of 0.5 to 20% by mass based on the resin and dry-milling the mixture at 70 to 90° C., in a solvent or varnish for a printing ink, followed by a treatment, for the purpose of inhibiting conversion of pigment primary particles into a needle-shaped pigment and improving the reddish hue and fluidity of the ink.

Patent Document 4 describes a method of using a prepigment obtained by adding a resin, a solvent and a specific pigment derivative to a crude copper phthalocyanine and dry-milling the mixture at 60 to 180° C.

However, in the above methods using the resin, a large amount of resin must be added so as to obtain sufficient effects and there may arise adhesion of a milled product to the inside of a milling machine due to heat generation during dry-milling, and ignition due to heat storage, and also there arises a problem such as deterioration of hue, viscoelasticity and emulsifiability of a printing ink as a result of deterioration of performance of the resin due to heat or oxidation.

In order to solve these problems, Patent Document 5 describes a method for producing a printing ink, which includes using those obtained by dry-milling a crude copper phthalocyanine which is surface-treated with a rosin-based compound in advance and an extender pigment and/or a resin for a printing ink. It is described that the amount of the rosin-based compound used for the treatment is from 1 to 50% by mass based on the crude copper phthalocyanine, and the amount of the extender pigment and/or the resin for a printing ink is from 1 to 50% by mass based on the crude copper phthalocyanine Patent Document 6 describes a method for producing a printing ink, which includes using a composition prepared from at least a crude copper phthalocyanine, an extender pigment in the amount of 1 to 100% by mass based on the crude copper phthalocyanine and a resin for a printing ink in the amount of 1 to 100% by mass based on the crude copper phthalocyanine.

However, in these methods, a resin for a printing ink and a rosin-based compound as a raw material of the resin for a printing ink are essential additive substances, and thus there still remain problems such as deterioration of productive efficiency due to adhesion to the inside of a dry milling machine and heat storage, ignition of the milled product, and quality deterioration of the printing ink due to quality deterioration of the resin.

The addition of plural substances such as a solvent, an extender pigment and a pigment derivative, together with the resin, leads to a limitation of the degree of freedom of design of a printing ink formula, and an increase in the costs of raw materials. Therefore, there has been a request to solve these problems.

Patent Document 1: Japanese Unexamined Patent Application, First Publication No. Hei 2-294365
Patent Document 2: Japanese Patent No. 3,139,396
Patent Document 3: Japanese Patent No. 3,159,049
Patent Document 4: Japanese Unexamined Patent Application, First Publication No. 2006-206804
Patent Document 5: Japanese Patent No. 3,872,356
Patent Document 6: Japanese Unexamined Patent Application, First Publication No. 2003-41173

DISCLOSURE OF THE INVENTION

Problems to be Solved by the Invention

Under these circumstances, the present invention has been made and an object thereof is to provide a pigment composition for a printing ink, which promotes efficiency in the production processes and also provides a printing ink having a high color strength, and a method for producing the same; and a method for producing a printing ink.

The object of the present invention is to provide a pigment for a printing ink and a pigment composition for a printing ink, which do not require a preliminary surface treatment of a crude copper phthalocyanine, and also do not require the use of a resin, a pigment derivative and a solvent during dry-milling; a method for producing a composition; and a method for producing a printing ink using the pigment composition; and to provide a method for producing a pigment composition for a printing ink by means of dry-milling of a crude copper phthalocyanine using a specific calcium carbonate, so as to achieve the object; and a pigment composition for a printing ink for providing a printing ink having excellent optical characteristics (color strength, transparency, gloss, etc.); and a method for producing a printing ink using the pigment composition for a printing ink.

Means for Solving the Problem

The present invention have intensively studied a method for producing a pigment composition, which can be suitably used for a printing ink, and a pigment composition obtained by the method for producing the same, and a method for producing a printing ink using the same, so as to achieve the above object and find a method for producing a pigment composition for a printing ink, which includes dry-milling a crude copper phthalocyanine and calcium carbonate having an average particle diameter of 20 to 1,500 nm substantially in the absence of a resin for a printing ink; and a method for producing a printing ink, which includes the steps of heating a mixture containing the pigment composition for a printing ink, a resin for a printing ink and a solvent for a printing ink, and wet-milling the mixture. Thus, the present invention has been completed.

The present invention provides a method for producing a pigment composition for a printing ink, which includes dry-milling a crude copper phthalocyanine and calcium carbonate having an average particle diameter of 20 to 1,500 nm substantially in the absence of a resin for a printing ink.

The present invention also provides a pigment composition for a printing ink, including an aggregate of copper phthalocyanine particles, characterized in that the copper phthalocyanine particles include two or more kinds of crystal forms, the aggregate contains the calcium carbonate particles therein, and a resin for a printing ink does not substantially exist in the aggregate.

The present invention further provides a method for producing a printing ink using the pigment composition for a printing ink, which includes the steps of heating a mixture of the pigment composition for a printing ink obtained by the above method for producing a pigment composition for a printing ink, a resin for a printing ink, and a solvent for a printing ink; and wet-milling the mixture.

Effects of the Invention

According to the present invention, it is possible to provide a method for producing a pigment composition for a printing ink, which can promote efficiency in the production processes and also can provide a printing ink having high color strength, gloss and transparency, and a method for producing a printing ink using the pigment composition for a printing ink. More particularly, according to the present invention, by dry-milling a crude copper phthalocyanine and calcium carbonate having an average particle diameter of 20 to 1,500 nm substantially in the absence of a resin for a printing ink, it becomes possible to not only prevent deterioration of productive efficiency due to adhesion of a resin for a printing ink or a rosin-based compound as a raw material thereof to the inside of a dry milling machine and heat storage, and to prevent ignition of a milled product and to inhibition of quality deterioration of a printing ink due to quality deterioration of a resin, but also to ensure the degree of freedom of design of a printing ink formula and to inhibit an increase in the costs of raw materials. Furthermore, by dry-milling a crude copper phthalocyanine using calcium carbonate having an average particle diameter 20 to 1,500 nm, it becomes possible to inhibit the crystal growth of copper phthalocyanine particles (primary particles) during transition of a crystal and to form fine particles having narrow particle size distribution and a small particle diameter. As a result, it is possible to provide a printing ink having excellent various optical characteristics (color strength, transparency, gloss, etc.) and printability (emulsifiability, printing durability, etc.).

BEST MODE FOR CARRYING OUT THE INVENTION

The present invention will be described in detail below.

Copper phthalocyanine is a cyclic compound including four isoindoles bonded through a nitrogen atom obtained, for example, by a method of heating phthalic anhydride or a derivative thereof with a copper compound in the presence of a catalyst such as ammonium molybdate in urea, a method of reacting phthalodinitrile with a copper compound, a method of heating an o-cyanobenzamide derivative with a copper compound, or a method of reacting a 1,3-diiminoisoindoline compound with a copper compound in a hydrophilic solvent. Usually, by washing the unpurified copper phthalocyanine, the content of the organic compounds other than copper phthalocyanine (hereinafter referred to as organic impurities) is reduced, followed by appropriate drying and milling to obtain a crude copper phthalocyanine.

In the present invention, the crude copper phthalocyanine means the crude copper phthalocyanine described above, preferably a stable type (β type) crude copper phthalocyanine obtained by reacting phthalic anhydride or a derivative thereof, urea or a derivative thereof and a metal compound such as a copper compound, or reacting phthalodinitrile with a metal compound such as a copper compound in which the content of organic impurities other than copper phthalocyanine is decreased to 5% by mass or less, and more preferably 3% by mass or less.

Herein, examples of the phthalic acid derivative include a phthalic acid salt, phthalic anhydride, phthalimide, phthalamic acid and a salt thereof or an ester thereof. Examples of the metal source include metal copper, a halide of copper (I) or copper (II), copper oxide, copper sulfate, copper sulfide, and copper hydroxide.

When these components are reacted, if necessary, the reaction is carried out by heating at 180 to 300° C. for 1 to 5 hours in the presence or absence of an organic solvent using a catalyst such as ammonium molybdate. Examples of the organic solvent include aromatic hydrocarbons such as alkylbenzene and alkylnaphthalene; alicyclic hydrocarbons such as alkylcyclohexane and decalin; aliphatic hydrocarbons such as decane and dodecane; aromatic nitro compounds such as nitrobenzene and nitrotoluene; and aromatic halogenated hydrocarbons such as trichlorobenzene and chloronaphthalene.

The unpurified copper phthalocyanine obtained by the above reaction immediately after synthesis is in the form of stable type (β type) crystal particles having an average particle diameter of about 5 to 15 μm, and this unpurified product usually contains, as impurities, about 5 to 20% by mass of a low-molecular weight organic compound by-produced during the reaction, the unreacted copper compound, and an inorganic compound such as a molybdenum compound derived from the catalyst used in the reaction. As an organic compound among impurities contained in the unpurified copper phthalocyanine, a phthalimide derivative is an exemplary example thereof.

The resultant unpurified copper phthalocyanine can be purified by washing with an inorganic acid solution or an inorganic base solution. Washing with the inorganic acid solution or inorganic base solution can also be carried out using the inorganic acid solution or inorganic base solution alone. Alternately, washing may be carried out using one wash and then sequentially carried out using the other wash. When washing is sequentially carried out using two kinds of washes, although there is no particular limitation on the order of the wash to be used, it is preferable to wash with the inorganic base solution after washing with the inorganic acid solution. In the washing with the inorganic acid solution, it is possible to remove, in addition to the unreacted copper compound, impurities such as organic impurities, and inorganic impurities such as a molybdenum compound derived from the catalyst used during the reaction.

Furthermore, impurities such as a phthalimide derivative can be removed by washing with the inorganic base solution, thus making it possible to obtain a crude copper phthalocyanine in which the content of the organic compound other than copper phthalocyanine is 5% by mass or less, and preferably 3% by mass or less. Examples of the inorganic base used herein include alkali metal hydroxides such as sodium hydroxide and potassium hydroxide, and the inorganic base is usually used as an aqueous solution having a density of about 1 to 5% by mass. The washing method includes, for example, a method in which the unpurified copper phthalocyanine is added in an inorganic base solution and, after stirring at 30 to 90° C. for about 0.5 to 5 hours and further separation operation such as filtration or centrifugal separation, the resultant solid is washed with water and then dried.

Since most of organic impurities such as a phthalimide derivative contained in the unpurified copper phthalocyanine are alkali-soluble compounds, most of organic impurities are dissolved in a liquid phase when washed using such a method, thus making it possible to obtain a crude copper phthalocyanine in which the content of the organic compound other than copper phthalocyanine is decreased to 5% by mass or less, and preferably 3% by mass or less.

When washed with the inorganic base solution, the unpurified copper phthalocyanine may be washed while introducing steam into the inorganic base solution. Specifically, the unpurified copper phthalocyanine is added in the inorganic base solution and, after stirring at 70 to 100° C. for about 0.5 to 5 hours while introducing steam into the slurry solution, filtration and a solid-liquid separation operation are carried out and the resultant solid is washed with water and then dried to obtain a crude copper phthalocyanine. Since hydrolysis of organic impurities is promoted by washing with the inorganic base solution while introducing steam, organic impurities can be dissolved in a liquid phase more efficiency, and thus organic impurities can be further decreased.

Furthermore, washing with an alcohol such as methanol, and washing with acetone may be carried out. It is possible to decrease organic impurities soluble in alcohol and acetone by washing with an alcohol and washing with acetone. It is possible to decrease organic impurities and inorganic impurities by appropriately using washing with an inorganic acid solution, washing with an alcohol and washing with acetone in combination, in addition to washing with an inorganic base solution.

Calcium carbonate used for dry-milling of the crude copper phthalocyanine of the present invention has a feature in an average particle diameter of 20 to 1,500 nm. It is difficult to produce calcium carbonate having an average particle diameter of less than 20 nm by a conventionally known synthesizing or milling method. It is not preferred that the average particle diameter is more than 1,500 nm because the optical characteristics (color strength, transparency, gloss, etc.), the printability (emulsifiability, printing durability, etc.) and the dry-milling efficiency of the resulting printing ink deteriorates.

The average particle diameter in the present invention is an average primary particle diameter of the length of the long side measured using a transmission electron microscope and can be measured by an usually known method, for example, a method using a transmission electron microscope.

The additive amount of calcium carbonate is not particularly limited and is preferably from 3 to 70 parts by mass based on 100 parts by mass of the crude copper phthalocyanine. When the content of calcium carbonate is less than the above range, it becomes difficult for the resulting printing ink to sufficiently inhibit aggregation of the milled copper phthalocyanine and to exhibit a color strength. In contrast, when the content is more than the above range, the optical characteristics and the printability deteriorate and the degree of freedom of the printing ink disappears, and it is not preferred.

There is no particular limitation on the crystal form of calcium carbonate. Calcium carbonate preferably has a crystal form of calcite or aragonite, or may have a crystal form of a mixture thereof.

Although calcium carbonate used in the present invention may be either synthetic calcium carbonate or heavy calcium carbonate, synthetic calcium carbonate can be used more preferably because of its low aggregation state and the low energy required for dry-milling.

The form of calcium carbonate is preferably a drying state with a moisture content of 1.5% or less in view of workability and adhesion to the inside of a dry milling machine, and may have either a hydrous slurry or wet cake form as long as characteristics of a powder of a crude copper phthalocyanine during mixing with a crude copper phthalocyanine are not impaired.

The synthetic calcium carbonate is obtained by firing limestone and chemically synthesizing using a carbonation process or a soluble salt reaction process and is sometimes called precipitated calcium carbonate or light calcium carbonate. In general, according to a synthesis method, it is possible to produce a colloidal or semicolloidal calcium carbonate having a fine and uniform cubic, fusiform or needle shape with a size of about 20 nm to 1,500 nm. In the production process, it is also possible to carry out a surface treatment for the purpose of improving dispersibility of calcium carbonate particles and inhibiting aggregation thereof.

On the other hand, heavy calcium carbonate is generally obtained by dry or wet milling and classification of limestone and has an amorphous particle shape.

The surface of calcium carbonate may be treated or not treated with at least one kind of a surface treating agent selected from the group consisting of a resin acid, a saturated fatty acid, an unsaturated fatty acid, an alicyclic carboxylic acid, a silane coupling agent, and salts thereof, but is preferably treated since fine and easily dispersible calcium carbonate particles are easily obtained and the efficiency of dry-milling with the crude copper phthalocyanine is improved.

As the surface treating agent, at least one kind of a surface treating agent selected from the group consisting of a resin acid, a saturated fatty acid, an unsaturated fatty acid, an alicyclic carboxylic acid, a silane coupling agent, and salt thereof can be exemplified.

Examples of the resin acid include abietic acid, neoabietic acid, palustric acid, levopimaric acid, dehydroabietic acid, pimaric acid, isopimaric acid, sandaracopimaric acid, communic acid, anticopalic acid, lambertianic acid, and dihydroagathic acid. Among these resin acids, abietic acid, neoabietic acid, dehydroabietic acid or palustric acid is preferable. The resin acid is particularly preferably abietic acid but is not limited thereto.

Examples of the salt of the resin acid include alkali metal salts such as sodium and potassium salts, and alkali earth metal salts such as magnesium and calcium salts of the resin acids described above. The salt of the resin acid is preferably potassium abietate, potassium neoabietate, potassium dehydroabietate, or potassium palustrate, and particularly preferably potassium abietate.

Examples of the resin acid derivative include disproportionated rosin, maleated rosin, polymerized rosin, and rosin ester. The resin acid derivative is particularly preferably disproportionated rosin or rosin ester but is not limited thereto.

Specific examples of the fatty acid include, but are not limited to, caproic acid, caprylic acid, capric acid, lauric acid, myristic acid, palmitic acid, stearic acid, arachic acid, behenic acid, lignoceric acid, cerotic acid, montanic acid, and melissic acid. Among these fatty acids, palmitic acid, stearic acid, lauric acid, or oleic acid is preferable.

Examples of the salt of the saturated fatty acid include alkali metal salts such as sodium and potassium salts, and alkali earth metal salts such as magnesium and calcium salts of the saturated fatty acids described above. The salt of the saturated fatty acid salt is preferably sodium palmitate, sodium stearate, or sodium laurate.

Examples of the unsaturated fatty acid include, but are not limited to, unsaturated fatty acids having one double bond, such as oleic acid, palmitoleic acid, erucic acid, caproleic acid, linderic acid, and eicosenoic acid; unsaturated fatty acids having two double bonds, such as linoleic acid; unsaturated fatty acids having three double bonds, such as hiragonic acid and linolenic acid; unsaturated fatty acids having four double bonds, such as arachidonic acid; and unsaturated fatty acids having a triple bonds, such as tariric acid. Among these unsaturated fatty acids, oleic acid or erucic acid is preferable.

Examples of the salt of the unsaturated fatty acid include alkali metal salts such as sodium and potassium salts, and alkali earth metal salts such as magnesium and calcium salts of the unsaturated fatty acids described above. The salt of the unsaturated fatty acid is preferably sodium oleate or sodium erucicate.

Examples of the alicyclic carboxylic acid include naphthenic acid.

The silane coupling agent is not particularly limited and it is possible to use a silane coupling agent which has hitherto been mixed with inks, coating materials, rubbers, and plastics. Examples of the silane coupling agent include vinyltrimethoxysilane, vinyltriethoxysilane, γ-chloropropyltrimethoxysilane, γ-aminopropyltriethoxysilane, N-(β-aminoethyl)-γ-aminopropyltrimethoxysilane, N-(β-aminoethyl)-γ-aminopropylmethyldimethoxysilane, γ-glycidoxypropyltrimethoxysilane, β-glycidoxypropylmethyldimethoxysilane, γ-methacryloxypropyltrimethoxysilane, γ-methacryloxypropylmethyldimethoxysilane, and γ-mercaptopropyltrimethoxysilane.

These surface treating agents can be used alone, or two or more kinds of them can be used in combination. Among these surface treating agents, a resin acid-based compound such as abietic acid, neoabietic acid, disproportionated rosin, or rosin ester; a fatty acid-based compound such as palmitic acid, stearic acid, lauric acid, or oleic acid; or any combination of them is preferable. Abietic acid, disproportionated rosin, stearic acid, or oleic acid, or any combination thereof is particularly preferable.

The surface treatment method can be carried out by a usually known method. Examples of the surface-treated calcium carbonate include, but are not limited to, HAKUENKA (trade name, manufactured by SHIRAISHI KOGYO KAISHA, LTD) and NEOLITE (trade name, manufactured by TAKEHARA KAGAKU KOGYO CO., LTD.).

The dry-milling method in the present invention will be described below.

According to dry-milling of the present invention, a crude copper phthalocyanine and the calcium carbonate are milled in a dry milling machine. The crude copper phthalocyanine and calcium carbonate may be separately charged in a milling machine and then milled. Alternately, after mixing the crude copper phthalocyanine and calcium carbonate in advance, the resulting mixture may be charged in a dry milling machine and then milled.

Dry-milling can be carried out utilizing an impact or shear force generated by collision between milling media or collision between milling media and an inner wall of a milling machine, or collision between particles to be milled, and may be carried out in the presence or absence of milling media. It is possible to use, as media, beads and rods having various sizes made of various commonly known materials.

It is possible to use, as the dry milling machine, conventionally known devices, for example, atriter, ball mill, vibrating mill, hammer mill, single- or multi-screw extruder, and kneader. It is also possible to use a Henshel mixer or jet mill using no milling media.

Dry-milling can be carried out in air, or may be carried out after optionally replacing the atmosphere in the device by a deoxidation atmosphere by passing an inert gas such as a nitrogen or helium gas through a dry milling machine. This method is effective in view of safety.

The crude copper phthalocyanine is converted into a mixed crystal type crude copper phthalocyanine having two or more kinds of crystal forms by milling. Therefore, it is preferred to control the content of an unstable type (α type) crystal of a milled product in milling of the crude copper phthalocyanine by the following reason. When the content of the unstable type (α type) crystal is high, the efficiency of transition of the copper phthalocyanine into the stable type (β type) crystal during the subsequent heating step deteriorates and copper phthalocyanine particles are likely to cause needle crystal growth, and thus problems such as deterioration of physical properties (viscosity, hue, color strength, etc.) of the printing ink may arise.

Since the unstable type (α type) crystal has a feature that the content increases as a milling force of dry-milling increases and also decreases as the treatment temperature becomes higher, the treatment is preferably carried out so that the content of the unstable type (α type) crystal falls within a range from 35 to 70% by adjusting the milling force and the treatment temperature. In order to adjust the content within the above range, it is preferred that dry-milling is usually carried out within a range from 65 to 150° C.

The content of the unstable type (α type) crystal milled product can be determined by the following procedure. That is, a proper amount of the milled product is sampled every lapsed milling time, and then the content is determined taking note of a ratio (Lα/Lβ) of a peak height (Lα) at a specific Bragg angle (2θ) of 6.8°±0.2° of an X-ray diffraction diagram of the sample to a peak height (Lβ) at a specific Bragg angle of 9.2°±0.2°.

It is preferred that dry-milling is carried out in the presence of a crude copper phthalocyanine and calcium carbonate so that an average particle diameter of the milled product falls within a range from 20 to 300 nm.

In this dry-milling treatment, calcium carbonate particles has a function of improving fine milling efficiency of the crude copper phthalocyanine and also inhibiting strong aggregation between micronized milling copper phthalocyanine particles, thus making it possible to obtain a milled product of a crude copper phthalocyanine, which has a high color strength. Since calcium carbonate used herein is subjected to a milling treatment simultaneously with the crude copper phthalocyanine and therefore has high refractive index and hiding power, it has such a merit that inexpensive calcium carbonate, which may exerts an adverse influence on transparency of the printing ink when used alone, can be used.

The milling time in the dry-milling is appropriately adjusted according to the milling temperature and the device to be used, the expected particle diameter of the milled product, or the pigment composition composed of the milled product after dry-milling, or target ink characteristics of the final printing ink, final printing ink using the pigment composition. This milling time is usually from about 30 minutes to 12 hours at the milling temperature described above.

The milling time varies depending on the kind of the grinder to be used. For example, when an atriter is used, the milling time is preferably about 45 minutes. When a ball mill is used, the milling time is preferably about 12 hours. In general, it is preferable to use the atriter since high milling efficiency is achieved and milling is completed within a short time.

In dry-milling, a copper phthalocyanine pigment derivative and a solvent for a printing ink can also be optionally used in combination for the purpose of easily controlling dry-milling efficiency and transition (α/β form transition) from an unstable type (α type) crystal into a stable type (β type) crystal.

As such a copper phthalocyanine pigment derivative, for example, there is exemplified copper phthalocyanine having a substituent such as a halogen atom, a sulfonic acid group, or a carboxylic acid group on one or more benzene rings, or a metal salt thereof, or salts of an ammonium salt and a cationic surfactant. It is also possible to use various derivatives through a methylene group, a carbonyl group, a sulfonyl group, or an imino group. The amount of the copper phthalocyanine pigment derivative used is not particularly limited and is from 0.1 to 20 parts based on 100 parts in terms of the mass of the crude copper phthalocyanine.

This milling can be carried out substantially in the absence of a liquid substance, or the milling can usually be carried out by adding 0.5 to 20% by mass of the liquid substance to the crude copper phthalocyanine as long as characteristics of the power are not impaired.

The phrase "dry-milling is carried out substantially in the absence of substantially resin for a printing ink" in the present invention means that no resin for a printing ink exists in the system during dry-milling, or a resin for a printing ink may exist in the amount lower than the amount which exerts an adverse influence on the effects of the present invention, namely, a resin for a printing ink may exist in the amount which does not exert an adverse influence on the effects of the present invention. More specifically, the amount varies depending on the kind of the resin for a printing ink and, for example, the amount is less than 1% by mass, more preferably less than 0.5% by mass, still more preferably less than 0.1% by mass, and most preferably 0% by mass, based on the copper phthalocyanine.

The pigment composition for a printing ink obtained by the dry-milling described above of the present invention includes an aggregate of copper phthalocyanine particles, characterized in that:
(1) the copper phthalocyanine particles include two or more kinds of crystal forms,
(2) the aggregate contains the calcium carbonate particles therein, and
(3) a resin for a printing ink does not substantially exist in the aggregate.

Because of high surface activity of particles, the micronized milled product exists in the form of an aggregate with a size of about several mm, which has an appearance in which fine copper phthalocyanine particles (primary particles) are aggregated. In that case, the aggregate of copper phthalocyanine particles of the present invention contains the calcium carbonate therein and, more particularly, calcium carbonate particles exits in a gap between particles of copper phthalocyanine, which constitute the aggregate (FIG. 1). Since dry-milling is carried out substantially in the absence of a resin for a printing ink, the resin for a printing ink does not substantially exist in the aggregate. The phrase "a printing ink does not substantially exist in the aggregate" in the present invention means that no resin for a printing ink exists in the aggregate, or a resin for a printing ink may exist in the amount lower than the amount which exerts an adverse influence on the effects of the present invention, namely, a resin for a printing ink may exist in the amount which does not exert an adverse influence on the effects of the present invention. More specifically, the amount varies depending on the kind of the resin for a printing ink and, for example, the amount is less than 1% by mass, more preferably less than 0.5% by mass, still more preferably less than 0.1% by mass, and most preferably 0% by mass, based on the copper phthalocyanine.

By the dry-milling described above, calcium carbonate is micronized into particles having an average particle diameter of 15 to 200 nm, and preferably 20 to 80 nm. Similarly, the crude copper phthalocyanine is micronized into copper phthalocyanine particles (primary particles) having an average particle diameter of 15 to 200 nm, preferably 17 to 100 nm, and more preferably 20 to 80 nm. The copper phthalocyanine particles are composed, for example, of the same or plural crystallites, and the average crystallite particle is from about 15 to 100 nm. Also, the particles are sometimes composed in an amorphous state. The crystallite size is a crystallite size of a stable type (β type) crude copper phthalocyanine calculated by substituting a half width at a Bragg angle 2θ of 9.3 of a wide angle x-ray diffraction chart in the Scherrer equation.

The step of heating a mixture containing a pigment composition for a printing ink obtained by dry-milling a crude copper phthalocyanine and calcium carbonate, a resin for a printing ink and a solvent (hereinafter referred to as a printing ink varnish), and the step of wet-milling the mixture will be described below.

This heating step is carried out for the purpose of transiting a crystal form of a dry-milled crude copper phthalocyanine into a β-form as a stable type crystal form, which is chemostructurally stable and is suited for a printing ink, from an α/β mixed crystal form and also facilitating a treatment of wet-milling which can be subsequently or simultaneously carried out, and is preferably carried out under warming at 70 to 180° C.

This step does not require stirring using a disperser, and also can be carried out while being left to stand under heating. In order to improve uniform mixing of a printing ink varnish and efficiency of transition into a stable type (β type) form from an α/β mixed crystal form, a stirring treatment using a single- or multi-screw dispersion stirrer or a kneader is preferable. Any conventionally known disperser and kneader can be used, and examples thereof include devices, for example, single- or multi-screw stirrers such as a disper and a homomixer, kneaders, and single- or multi-screw extruders. These devices can be used in combination.

The transition time varies depending on the solvent for a printing ink, the heating temperature and the stirring state used, and the heating step can be completed within from about several minutes to 3 hours. Most of copper phthalocyanine is transited into a stable type (β type) crystal by this heating step and the wet-milling step which can be subsequently or simultaneously carried out. However, a trace amount of 1% or less of an unstable type (α type) crystal sometimes exists.

It is possible to use, as the resin for a printing ink and the solvent used in this step, a printing ink varnish prepared from a resin for a printing ink and a solvent for a printing ink and, if necessary, a gelling agent in advance, and a commercially available printing ink varnish.

The resin for a printing ink contains at least one kind of those used generally in a printing ink, for example, a rosin-modified phenol resin, a rosin-modified maleic acid resin, an alkyd resin, a petroleum resin-modified rosin-modified phenol resin, and a petroleum resin, preferably a rosin-modified phenol resin. Herein, the rosin-modified phenol resin contains, as a main component, those obtained by a condensation reaction of a phenol resin obtained by reacting an alkylphenol with formaldehyde, and rosin, and also contains a polyhydric alcohol as a constituent component of the resin.

Examples of the solvent for a printing ink include a high-boiling point petroleum-based solvent, an aliphatic hydrocarbon solvent, a higher alcohol-based solvent and a vegetable oil, and contain an aromatic component of less than 1% by mass. The solvent may be used alone or in combinations of two or more.

It is possible to use, as the vegetable oil as used herein, any vegetable oil can be used as long as it is usually used as an ink material. Examples thereof include oils such as soybean oil, linseed oil, tung oil, castor oil, dehydrated castor oil, corn oil, safflower oil, canola oil; and synthetic oils (and reclaimed oils). These vegetable oils can be used alone, or two or more kinds of them can be used in combination.

The solvent for a printing ink is preferably a naphthene-based or paraffin-based solvent having an aniline point of 65° C. to 100° C., or soybean oil. Examples of the solvent for a printing ink include AF Solvent 4 (content of an aromatic component: 0.1% by mass), AF Solvent 5 (content of an aromatic component: 0.2% by mass), AF Solvent 6 (content of an aromatic component: 0.3% by mass), and AF Solvent 7 (content of an aromatic component: 0.2% by mass) manufactured by NIPPON OIL CORPORATION, and soybean oil (soybean salad oil manufactured by The Nisshin Oillio Group, Ltd.).

Regarding the mixing ratio of the resin for a printing ink to the solvent for a printing ink in the preparation of a printing ink varnish, the resin can be used in the amount adjusted appropriately within a range of 20 to 75% by mass and the solvent can be used in the amount adjusted appropriately within a range of 25 to 80% by mass.

The heating step can also be carried out in the presence of the pigment derivatives and additives described above. Examples of additives include gelling agents, pigment dispersing agents, metal dryers, dry inhibitors, antioxidants, abrasion resistance improvers, anti-setoff agents, nonionic surfactants, and polyhydric alcohols.

The wet-milling step will be described below.

Each particle diameter of a crude copper phthalocyanine in a pasty mixture subjected to transition from a mixed crystal into a stable type (β type) crystal which is stable and is also suited for a printing ink, and a wetting treatment with a printing ink varnish in the heating step is adjusted to abut 15 to 350 nm. However, particles are in the state of an aggregate and an agglomerate and cannot be said to a pigment dispersion state which is suited for a printing ink. A printing ink is completed by subjecting this pasty mixture to a wet-milling treatment so that the degree of dispersion becomes 5 micron or less, using a three roll mill, a beads mill, or a single- or multi-screw extruder used generally in the production of a printing ink.

According to this wet-milling treatment, since the mass of copper phthalocyanine in the pasty mixture can be set at a high density and a high dispersion force can be obtained by selecting the kind and particle size of media, the treatment is preferably carried out using a beads mill. It is also possible to separately charge a crude copper phthalocyanine, a resin for a printing ink, a solvent, a printing ink varnish, and an additive, and to simultaneously carry out the step of a heat treatment and the step of wet-milling by using a kneading disperser capable of heating and cooling, such as a single- or multi-screw extruder. Although the costs of the device become higher, it is an effective means.

In the step of a heat treatment and the step of wet-milling which can be subsequently and simultaneously carried out, a final printing ink may be prepared in a single stage process using a varnish for a printing ink, a solvent for a printing ink, an extender base ink, and additive so that the density of a pigment becomes the density required to a printing ink which is finally used (referred to as a final printing ink). In general, for the purpose of decreasing the amount of a liquid to be treated in the step of a heat treatment and the step of wet-milling and improving productive efficiency, a final printing ink is preferably prepared in a multi-stage process of preparing a mixture having a higher pigment density than that of the final printing ink (hereinafter referred to as a base ink for a printing ink) using only requisite varnish for a printing ink, solvent and additives, and diluting the resulting mixture with a varnish for a printing ink, a solvent for a printing ink, an extender base ink, and additives.

The mass of copper phthalocyanine in the base ink for a printing ink is preferably from 15 to 40% taking productive efficiency of the step of a heat treatment and the step of a wet-milling treatment into consideration.

Regarding copper phthalocyanine contained in the base ink for a printing ink or final printing ink, the crystal growth of primary particles during transition of a crystal is inhibited and fine particles having narrow particle size distribution and a small particle diameter are formed. The reason is not clear, but it is believed that calcium carbonate added during dry-milling acted as a milling aid, and also exhibited an action of inhibiting the crystal growth. As a result, an average particle diameter of copper phthalocyanine (primary particles) contained in the base ink for a printing ink or final printing ink is preferably from 15 to 350 nm, and more preferably from 20 to 200 nm. Existence of giant particles having a particle diameter of more than 400 nm is inhibited and, for example, it is possible to obtain a state where giant particles having a particle diameter of more than 400 nm do not exist. Furthermore, the copper phthalocyanine are not in the form of a needle crystal having a large ratio of the length of the long side to that of the short side of a crystal form size (aspect ratio), but in the form of a cubic crystal having a small aspect ratio. In virtue of these features, a printing ink using the pigment composition for a printing ink of the present invention is excellent in various optical characteristics (color strength, transparency, gloss, etc.) and printability (emulsifiability, printing durability, etc.).

The pigment composition for a printing ink of the present invention can be applied to various printing inks such as offset printing ink (heat-set web offset ink, sheet fed ink, newspaper ink, UV ink, etc.), flexo printing ink, gravure printing ink, and special ink, and can be particularly preferably applied to offset printing ink.

EXAMPLES

The present invention will be described in detail below, but the present invention is not limited to the following Examples. Parts and percentages are by mass unless otherwise specified.

The measurements and evaluations in the Examples were carried out according to the following methods.
(Measurement of Content Ratio of Crystals of Copper Phthalocyanine)

The content ratio of an unstable type ($\alpha$ type) crystal to a stable type ($\beta$ type) crystal of copper phthalocyanine in a milled product and a prototype ink was determined taking note of a ratio ($L\alpha/L\beta$) of a peak height ($L\alpha$) at a specific Bragg angle ($2\theta$) of $6.8°\pm0.2°$ of an X-ray diffraction diagram of the sample to a peak height ($L\beta$) at a specific Bragg angle of $9.2°\pm0.2°$, using a powder X-ray diffractometer RINT1100 manufactured by Rigaku Corporation.
(Measurement of Purity of Copper Phthalocyanine)

Purity was measured by a sulfuric acid process.
(Average Particle Diameter of Copper Phthalocyanine Primary Particles)

An average particle diameter of copper phthalocyanine primary particles was determined by the following procedure. After diluting a substance to be measured with cyclohexane by 500 to 5,000 times (mass ratio), the resulting solution was dropped on a grid for transmission electron microscope (TEM) photography and dried, and then images were taken. The length of the major diameter of 100 primary particles of copper phthalocyanine selected from among images thus taken was measured and averaged.
(Average Particle Diameter of Calcium Carbonate)
Calcium Carbonate used for Dry-Milling An average particle diameter of calcium carbonate was determined by the following procedure. After diluting calcium carbonate with cyclohexane by 500 to 5,000 times (mass ratio), the resulting solution was dropped on a grid for transmission electron microscope (TEM) photography and dried, and then images were taken. The length of the major diameter of 100 primary particles of copper phthalocyanine selected from among images thus taken was measured and averaged.
Calcium Carbonate After Dry-Milling After cutting a pigment composition for a printing ink (aggregate) obtained by dry-milling into a thin film slice using a microtome, images of a section of the aggregate were taken. The length of the major diameter of 100 primary particles of calcium carbonate selected from among images thus taken was measured and averaged.
(Measurement of Degree of Dispersion of Prototype Ink)

The degree of dispersion of prototype ink was determined by the following procedure. An ink was placed on the deepest portion of a grind meter in which a steel board is provided with two grooves each having a depth within a range from 0 to 0.025 mm, and the ink was spread towards the shallow portion using a scraper. Then, the degree of dispersion of the ink was determined by the scale at the position of a line formed on the place having a depth which is less than the diameter of a coarse particle.
*) Measurement was performed according to the method described in 5.1.2: Printing Ink Test Procedure (1) of II-III Printing Ink of Shikizai Kogaku Handbook (Dye Engineering Handbook) Edited by Japan Society of Colour Material.
(Method for Evaluation of Color Strength of Prototype Ink)

A printing ink (5 g) and 95 g of a white ink (CARTON CELF 709 WHITE, manufactured by DIC (former Dainippon Ink and Chemicals, Incorporated) are well mixed to obtain an ink for confirmation of a color strength. A color strength is evaluated through drawdown by the following procedure using this white diluted ink.

Regarding a comparison of a numerical value of the color strength, using the method described in Japanese Unexamined Patent Application, First Publication No. 2003-73581, the measured value of the printing ink obtained in Comparative Example 12 was assumed as 100.
(Method for Evaluation of Gloss of Prototype Ink)

Each ink (0.125 ml) produced in Examples 1 to 7 and Comparative Examples 1 to 5 was printed on an art paper according to the color printing method defined in Japanese Industrial Standard JIS K5701-1 to obtain a printed product. Gloss of this printed product was measured by a reflection type gloss meter manufactured by Gardner Co. and the numerical value was shown.
(Method for Evaluation of Transparency of Prototype Ink)

Transparency difference was measured and evaluated by the drawdown method described in 5.1.2: Printing Ink Test Procedure (8) (ii) of II-III Printing Ink of Shikizai Kogaku Handbook (Dye Engineering Handbook) edited by Japan Society of Colour Material. Samples with very high transparency were rated "5", and samples with very high transparency were rated "1".
(Method for Evaluation of Optical Density of Prototype Ink)

An ink (0.125 cc) was weighed, printed on a paper surface by RI tester and then dried. After measuring ten points of the printed product by a spectrophotometer "SpectroEye" manufactured by Gretagmacbeth Co. according to Density Standard DIN16536, and an average excluding a maximum value and a minimum value was regarded as a color strength (optical density) of the ink.

Production Example 1

Production of Crude Copper Phthalocyanine 4,000 parts of a mixture of 1,218 parts of phthalic anhydride, 1,540 parts of urea, 200 parts of anhydrous cuprous chloride, 5 parts of ammonium molybdate and HS-SOL-700 (manufactured by HwaSung Corporation) as an inert solvent was charged in a reactor, heated to 200° C. while stirring and then reacted at the same temperature for 2.5 hours. After the completion of the reaction, the inert solvent was distilled off under reduced pressure and the remaining reaction product was added in 8,000 parts of 2% hydrochloric acid (aqueous solution), followed by stirring at 70° C. for 1 hour and further suction filtration to obtain a cake. Subsequently, the resultant cake was added in 8,000 parts of an aqueous 2% sodium hydroxide solution, followed by stirring at 70° C. for 1 hour, neutralization and further suction filtration. The cake thus obtained was well washed with warm water at 80° C. and then dried to obtain a crude copper phthalocyanine (purity of 98%) having a stable type (β type) crystal form.

Example 1

Production-1 of Pigment Composition for a Printing Ink

The crude copper phthalocyanine of Production Example 1 and calcium carbonate were mixed at the ratio shown in Table 1 so that the weight of the objective pigment composition for a printing ink becomes 500 g, placed in an atriter having an inner volume of 25 liter (including 67 Kg of steel balls having a diameter of ⅜ inch) and then milled at 200 rpm and an inner temperature of 80 to 110° C. for 60 minutes to obtain a pigment composition for a printing ink. An average particle diameter of primary particles of copper phthalocyanine in the resultant pigment composition for a printing ink, a ratio of α type crystal/β type crystal, and the existence of calcium carbonate particles contained in an aggregate formed by aggregation of copper phthalocyanine particles were confirmed by TEM micrograph (FIG. 1). The average particle diameter is shown in Table 1. FIG. 1 is a sectional view showing a micrograph taken with a transmission electron microscope (TEM) of a section of a thin film slice, cut by using a microtome, of a pigment composition for a printing ink (aggregate) obtained by dry-milling. The confirmation results revealed that calcium carbonate particles (black dots) exist in an aggregate (gray bulky portion as the background) of copper phthalocyanine particles.

Next, in Examples 2 to 10, the same operation as in Example 1 was carried out under the conditions described in Table 1 to obtain pigment compositions for a printing ink.

Comparative Example 1

Production-2 of Pigment Composition for a Printing Ink

In Comparative Examples 1 to 4, the same operation as in Example 1 was carried out, except that the crude copper phthalocyanine obtained in Production Example 1, and a rosin-modified resin (Beccasite F7310, manufactured by DIC (former Dainippon Ink and Chemicals, Incorporated)) and calcium carbonate shown in Table 1 were used in combination, pigment compositions for a printing ink described in Table 1 were obtained.

TABLE 1

| (Table 1) Number of Example and Comparative Example | Characteristics of respective raw materials added | | | | | | | | Characteristics of respective components after dry-milling | | |
|---|---|---|---|---|---|---|---|---|---|---|---|
| | A Parts by mass | B Parts by mass | C Parts by mass | A:C Weight ratio | Characteristics of calcium carbonate added | | | | A | | C |
| | | | | | Crystal form | Average particle diameter (nm) | Surface treating agent | Synthetic/ Heavy Shape | Average particle diameter (nm) | α/β crystal ratio | Average particle diameter (nm) |
| Example 1 | 80 | 0 | 20 | 100:25 | Cal | 20 | Contained | SC | 40 | 63/37 | 20 |
| Example 2 | 97.1 | 0 | 2.9 | 100:3 | Cal | 80 | Contained | SC | 80 | 58/42 | 60 |
| Example 3 | 58.8 | 0 | 41.2 | 100:70 | Cal | 80 | Contained | SC | 80 | 55/45 | 60 |
| Example 4 | 80 | 0 | 20 | 100:25 | Cal | 150 | Not contained | SC | 75 | 60/40 | 80 |
| Example 5 | 80 | 0 | 20 | 100:25 | Cal | 1,000 | Not contained | HA | 75 | 55/45 | 100 |
| Example 6 | 80 | 0 | 20 | 100:25 | Cal | 1,200 | Not contained | SF | 80 | 57/43 | 110 |
| Example 7 | 90.9 | 0 | 9.1 | 100:10 | Cal | 80 | Contained | SC | 75 | 60/40 | 50 |
| Example 8 | 66.7 | 0 | 33.3 | 100:50 | Cal | 150 | Not contained | SC | 75 | 59/41 | 80 |
| Example 9 | 80 | 0 | 20 | 100:25 | Ara | 300 | Not contained | SN | 75 | 57/43 | 80 |
| Example 10 | 66.7 | 0 | 33.3 | 100:50 | Ara | 300 | Not contained | SN | 80 | 57/43 | 80 |
| Comparative Example 1 | 100 | 0 | 0 | — | — | — | — | — | 130 | 62/38 | — |
| Comparative Example 2 | 86 | 14 | 0 | — | — | — | — | — | 120 | 62/38 | — |
| Comparative Example 3 | 80 | 0 | 20 | 100:25 | Cal | 2,000 | Not contained | HA | 190 | 52/48 | 250 |
| Comparative Example 4 | 70.2 | 15 | 14.8 | 100:21 | Cal | 80 | Contained | SC | 100 | 61/39 | 80 |

Abbreviations in the table are as follows:
A: copper phthalocyanine, B: resin, C: calcium carbonate, Cal: calcite, Ara: aragonite, SC: synthetic cube, HA: heavy amorphous, SF: synthetic fusiform, and SN: synthetic needle.

Production Example 2

Production of Printing Ink Varnish 45 parts of a rosin-modified phenol resin (Beccasite F7310, manufactured by DIC (former Dainippon Ink and Chemicals, Incorporated)), 15 parts of soybean oil and 39 parts of AF Solvent 7 (manufactured by NIPPON OIL CORPORATION) were charged, heated to 180° C. and allowed to stand at the same temperature for 50 minutes, and then 1 part of aluminum chelate (aluminum, diisopropoxide, monoethyl acetate) as a gelling agent was charged, followed by stirring at 180° C. for 30 minutes to obtain a varnish for a printing ink.

Example 11

Production of Base Ink for a Printing Ink

The pigment composition for a printing ink obtained in Example 1, the printing ink varnish obtained in Production Example 2, AF Solvent 7 (manufactured by NIPPON OIL CORPORATION) and soybean oil (manufactured by SHIRAISHI KOGYO KAISHA, LTD) were uniformly mixed at the mixing ratio shown in Table 2 so that the content of copper phthalocyanine becomes 30% by mass, and then subjected to a heat treatment at 90 to 120° C. for 2 hours. Next, a milling treatment was carried out at a temperature of 90° C. to 110° C. so that the degree of dispersion becomes 5 micron or less, using a beads mill (K8 type laboratory beads mill, manufactured by Buhler Co., φ2 mm zirconia beads, filling ratio of 90%, rotor rotation rate of 950 rpm) to obtain a base ink for a printing ink.

Next, in Examples 12 to 20 and Comparative Examples 5 to 8, the same operation as in Example 11 was carried out according to the composition described in Table 2 to obtain base inks for a printing ink.

Production Example 3

Production of Extender Base Ink 40 parts of calcium carbonate (HAKUENKA T-DD, manufactured by SHIRAISHI KOGYO KAISHA, LTD), 50 parts of the printing ink varnish obtained in Production Example 2 and 10 parts of AF Solvent 7 (manufactured by NIPPON OIL CORPORATION) were uniformly stirred and mixed and then subjected to a milling treatment using a three roll mill until the particle size becomes 5 μm or less to obtain an extender base ink.

TABLE 2

| (Table 2) Number of Example and Comparative Example | Dry-milled product used | Printing ink varnish | AF solvent | Soybean oil | Total |
|---|---|---|---|---|---|
| Example 11 | 37.5 (Example 1) | 54.0 | 6.5 | 2.0 | 100.0 |
| Example 12 | 30.9 (Example 2) | 61.6 | 6.5 | 6.5 | 100.0 |
| Example 13 | 51.0 (Example 3) | 43.0 | 4.0 | 2.0 | 100.0 |
| Example 14 | 37.5 (Example 4) | 54.0 | 6.5 | 2.0 | 100.0 |
| Example 15 | 37.5 (Example 5) | 54.0 | 6.5 | 2.0 | 100.0 |
| Example 16 | 37.5 (Example 6) | 54.0 | 6.5 | 2.0 | 100.0 |
| Example 17 | 33.0 (Example 7) | 58.5 | 6.5 | 2.0 | 100.0 |
| Example 18 | 45.0 (Example 8) | 47.5 | 6.5 | 1.0 | 100.0 |
| Example 19 | 37.5 (Example 9) | 54.0 | 6.5 | 2.0 | 100.0 |
| Example 20 | 45.0 (Example 10) | 47.5 | 6.5 | 1.0 | 100.0 |
| Comparative Example 5 | 30.0 (Comparative Example 1) | 62.0 | 8.0 | 0.0 | 100.0 |
| Comparative Example 6 | 34.9 (Comparative Example 2) | 51.0 | 12.3 | 1.8 | 100.0 |
| Comparative Example 7 | 37.5 (Comparative Example 3) | 54.0 | 6.5 | 2.0 | 100.0 |
| Comparative Example 8 | 42.7 (Comparative Example 4) | 51.1 | 4.2 | 2.0 | 100.0 |

The average particle diameter, particle size distribution, aspect ratio and crystal form of copper phthalocyanine (primary particles) contained in the base inks for a printing ink obtained in Examples 11 to 20 and Comparative Examples 5 to 8 are shown in Table 3.

TABLE 3

| (Table 3) Number of Example and Comparative Example | Average particle diameter (nm) | Particle size distribution (nm) | Aspect ratio | Crystal form |
|---|---|---|---|---|
| Example 11 | 55 | 20-190 | 1.5 | β |
| Example 12 | 95 | 20-200 | 1.6 | β |
| Example 13 | 95 | 20-200 | 1.6 | β |
| Example 14 | 90 | 20-200 | 1.5 | β |
| Example 15 | 90 | 20-200 | 1.5 | β |
| Example 16 | 100 | 20-200 | 1.6 | β |
| Example 17 | 90 | 20-200 | 1.5 | β |
| Example 18 | 90 | 20-200 | 1.6 | β |
| Example 19 | 90 | 20-200 | 1.5 | β |
| Example 20 | 100 | 20-200 | 1.6 | β |
| Comparative Example 5 | 210 | 20-400 | 1.9 | β |
| Comparative Example 6 | 205 | 20-350 | 1.9 | β |
| Comparative Example 7 | 200 | 20-370 | 1.9 | β |
| Comparative Example 8 | 110 | 20-200 | 1.8 | β |

Example 21

Production of Printing Ink

The base ink for a printing ink obtained in Example 11, the printing ink varnish obtained in Production Example 2, AF Solvent 7 (manufactured by NIPPON OIL CORPORATION) and the extender base ink obtained in Production Example 3 were used in combination according to the formulation shown in Table 4 and the viscosity measured at 25° C. by Laray Viscometer was adjusted within a range from 20 to 25 Pa·s under stirring to obtain a printing ink.

Next, in Examples 22 to 30 and Comparative Examples 9 to 12, the same operation as in Example 21 was carried out according to the composition described in Table 4 to obtain base inks for a printing ink.

TABLE 4

| (Table 4) Number of Example and Comparative Example | Base ink for printing ink used | Printing ink varnish | Extender base ink | AF solvent | Total |
|---|---|---|---|---|---|
| Example 21 | 45.0 (Example 11) | 42.0 | 7.0 | 6.0 | 100.0 |
| Example 22 | 45.0 (Example 12) | 35.0 | 14.0 | 6.0 | 100.0 |
| Example 23 | 45.0 (Example 13) | 49.0 | 0.0 | 6.0 | 100.0 |
| Example 24 | 45.0 (Example 14) | 42.0 | 7.0 | 6.0 | 100.0 |

TABLE 4-continued (Table 4)

| Number of Example and Comparative Example | Base ink for printing ink used | Printing ink varnish | Extender base ink | AF solvent | Total |
|---|---|---|---|---|---|
| Example 25 | 45.0 (Example 15) | 42.0 | 7.0 | 6.0 | 100.0 |
| Example 26 | 45.0 (Example 16) | 42.0 | 7.0 | 6.0 | 100.0 |
| Example 27 | 45.0 (Example 17) | 38.0 | 12.0 | 5.0 | 100.0 |
| Example 28 | 45.0 (Example 18) | 50.0 | 0 | 5.0 | 100.0 |
| Example 29 | 45.0 (Example 19) | 43.0 | 7.0 | 5.0 | 100.0 |
| Example 30 | 45.0 (Example 20) | 50.0 | 0 | 5.0 | 100.0 |
| Comparative Example 9 | 45.0 (Comparative Example 5) | 34.5 | 15.0 | 5.5 | 100.0 |
| Comparative Example 10 | 45.0 (Comparative Example 6) | 35.0 | 15.0 | 5.0 | 100.0 |
| Comparative Example 11 | 45.0 (Comparative Example 7) | 42.0 | 7.0 | 6.0 | 100.0 |
| Comparative Example 12 | 45.0 (Comparative Example 8) | 37.5 | 8.0 | 9.5 | 100.0 |

Thereafter, the resulting printing inks were evaluated. The results are shown in Table 5.

More specifically, the color strength was calculated by the following procedure. In this Example, the color strength ($D_{CEx.12}$) of the printing ink (Comparative Example 12) is assumed as 100 which is a standard. When an example of determining the color strength ($D_{Ex.21}$) of the printing ink (Example 21) to the printing ink (Comparative Example 12) is shown, the mass of both inks is 30%. X g of a white ink is further added to a printing ink having a deep color (Example 21) thereby allowing the density of the ink to become equivalent to that of the printing ink (Comparative Example 12). At this time, the following equations are established.

[Equation 1]

$$D_{Ex.21} \times (5 \times 0.3)/(95+X) = D_{CEx.12} \times (5 \times 0.3)/95 \quad (1)$$

In this Example, since $D_{CEx.12}$=100, $D_{Ex.21}$ can be obtained by the following equation.

[Equation 2]

$$D_{Ex.21} = (95+X)/95 \quad (2)$$

In the case of a printing ink (Example 21), since the density became equivalent as a result of the addition of 9.5 g of a white ink to the printing ink (Example 21), the color strength of the printing ink (Example 21) is found to be 110 by equation (2).

The results of the Examples and Comparative Examples revealed that a pigment composition for a printing ink containing a specific extender pigment obtained by the production method of the present invention, and a printing ink using the pigment composition for a printing ink have higher color strength than that of a printing ink obtained by a conventional method.

BRIEF DESCRIPTION OF THE DRAWINGS

FIG. 1 is a sectional view showing a micrograph taken with a transmission electron microscope (TEM) of a section of a thin film slice, cut by using a microtome, of a pigment composition for a printing ink (aggregate) obtained by dry-milling.

DESCRIPTION OF REFERENCE NUMERALS

1: Calcium carbonate particles

The invention claimed is:

1. A pigment composition for a printing ink, comprising an aggregate of copper phthalocyanine particles, characterized in that (1) the copper phthalocyanine particles include two or more kinds of crystal forms, (2) the aggregate contains the calcium carbonate particles therein, and (3) a resin for a printing ink does not substantially exist in the aggregate,
wherein the copper phthalocyanine particles include an unstable type crystal form and the content of the unstable type crystal falls within a range from greater than 35 to 70% in the particles, and
wherein the calcium carbonate particles have an average particle diameter of 15 to 200 nm.

TABLE 5

(Table 5)

| Number of Example and Comparative Example | Base ink for printing ink used | Evaluation of printing ink | | | |
|---|---|---|---|---|---|
| | | Color strength | Gloss | Transparency | Optical density |
| Example 21 | Example 11 | 110 | 68 | 5 | 2.11 |
| Example 22 | Example 12 | 105 | 67 | 4 | 2.06 |
| Example 23 | Example 13 | 107 | 65 | 4 | 2.08 |
| Example 24 | Example 14 | 110 | 65 | 4 | 2.10 |
| Example 25 | Example 15 | 110 | 65 | 4 | 2.10 |
| Example 26 | Example 16 | 105 | 65 | 3 | 2.05 |
| Example 27 | Example 17 | 107 | 67 | 4 | 2.08 |
| Example 28 | Example 18 | 110 | 67 | 4 | 2.10 |
| Example 29 | Example 19 | 107 | 66 | 4 | 2.08 |
| Example 30 | Example 20 | 110 | 65 | 3 | 2.10 |
| Comparative Example 9 | Comparative Example 5 | 95 | 62 | 3 | 1.95 |
| Comparative Example 10 | Comparative Example 6 | 100 | 64 | 3 | 1.96 |
| Comparative Example 11 | Comparative Example 7 | 95 | 60 | 2 | 1.94 |
| Comparative Example 12 | Comparative Example 8 | 100 | 64 | 3 | 2.02 |

2. The pigment composition for a printing ink according to claim 1, wherein the copper phthalocyanine particles have an average particle diameter of 20 to 300 nm.

3. The pigment composition for a printing ink according to claim 1, wherein the content of the unstable type crystal falls within a range from 55 to 70% in the particles.

\* \* \* \* \*